Nov. 16, 1965   E. C. BAROCELA   3,218,115
FILM ENGAGEMENT DEVICE
Filed Feb. 24, 1964   2 Sheets-Sheet 1

INVENTOR.
EDWARD C. BAROCELA
BY
Bierman + Bierman
ATTORNEYS

INVENTOR.
EDWARD C. BAROCELA
BY
Bierman & Bierman
ATTORNEYS

United States Patent Office 3,218,115
Patented Nov. 16, 1965

3,218,115
FILM ENGAGEMENT DEVICE
Edward C. Barocela, Levittown, N.Y., assignor to Instruments Corporation of America, New York, N.Y., a corporation of New York
Filed Feb. 24, 1964, Ser. No. 346,617
11 Claims. (Cl. 352—158)

This invention relates to an automatic engagement device which clamps a motion picture film into an object plane for projection by an optical system onto a viewing screen. The invention has particular reference to a series of idler rollers operating in conjunction with a film guide and a sprocket wheel for engaging the film and for pulling it through the object plane at a constant predetermined speed. This engagement device is particularly adapted for motion picture projectors which convert moving images on a film strip into stationary images on a viewing screen.

The present invention is a part of a motion picture projector having an optical system described in patent applications Serial Nos. 136,246, filed Sept. 6, 1961 and 207,189, filed July 3, 1962 by the present inventor, both now abandoned. In these prior applications a projection system is described in which a film having discrete pictures is moved through an object plane at a constant predetermined speed. The optical system for such a projector includes a rotating element having a plurality of spherical faces and such an element produces a stationary image of each successive film picture. Because of the simplicity of the film handling means, an automatic film engaging device is comparatively easy to construct and maintain. With such a device the operator of the projector simply threads the film through a slot and then turns on the main projector switch. A solenoid operates the engaging device and no further adjustment is necessary.

One of the objects of this invention is to provide an improved engaging device for motion picture projectors which avoids one or more of the disadvantages and limitations of prior art arrangements.

Another object of the invention is to provide means for moving the film past the projector at a fast forward or reverse speed, without further handling of the film or reels.

Another object of the invention is to facilitate the film threading of a motion picture projector.

Another object of the invention is to eliminate the fine adjustments generally required to thread and position a motion picture film in a projector.

Another object of the invention is to provide an adequate film drive mechanism for a projector having an optical system which projects sequential picture frames from a film strip moving at a constant velocity.

Another object of the invention is to provide a mechanical device for engaging a motion picture film each time a start switch is turned on and for disengaging the film each time the switch is turned off.

The invention includes a film engagement device in a motion picture projector containing a motion picture film having discrete images and a plurality of spaced sprocket holes. An apertured film guide is positioned within the projector for guiding the film through an object plane during projection. The film is pulled through the object plane at a constant predetermined speed by a driven sprocket wheel. A movable arm is arranged within the projector adjacent to the film guide and carries at least one idler roller for shifting the film into and out of an engaging position with the sprocket wheel. A spring is attached to the movable arm for moving it out of its engaging position and a solenoid is coupled to the arm for moving it into engaging position. The solenoid is controlled by an electrical control circuit for operating the solenoid whenever power is applied to the projector.

For a better understanding of the present invention, together with other and further objects thereof, reference is made to the following description taken in connection with the accompanying drawings.

Figure 1:
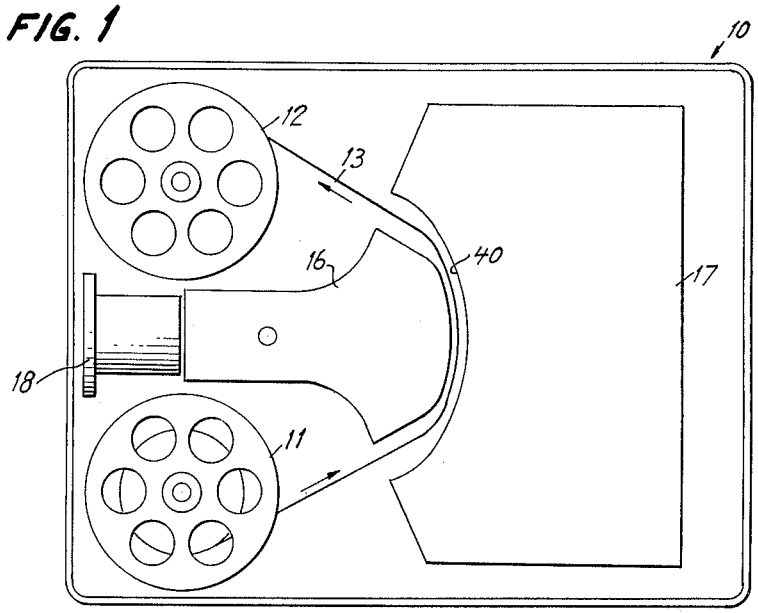
FIG. 1 is a side view of the projector showing the storage and take-up reels, the projector lens, and the two cover plates which cover most of the film apparatus.

Referring now to the figures, the projector is contained in a casing 10 and includes a supply reel 11 and a take-up reel 12. The film 13 is the usual type having discrete picture images arranged in sequence along the film strip and also containing sprocket holes which are equally spaced along the strip for engagement with a sprocket wheel. The projector system includes a lamp 14, not shown in FIGS. 1 or 2 and a motor 15 which is coupled to the usual belts and gears for operating the machine. In FIG. 1 most of the operating components are protected by cover plates 16 and 17 and a projection lens 18 focuses the image of the picture onto a viewing screen (not shown).

Figure 2:
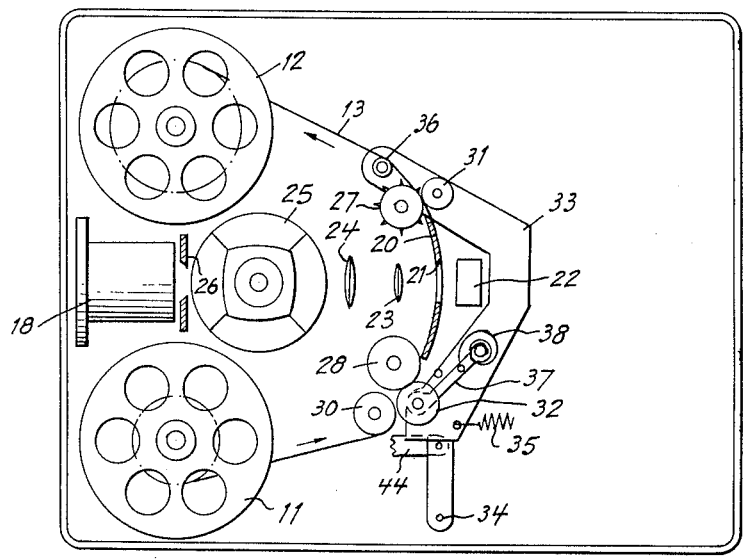
FIG. 2 is a view similar to FIG. 1 but with the cover plates removed and showing the projector optics, the film guide, the sprocket wheel, and the movable arm which clamps the film into its projecting position.

FIG. 2 shows a film guide 20 for guiding the film 13 through an object plane and past an aperture 21. Light from the lamp 14 is received through a partition and reflected by a mirror 22 and then directed through the film and through two stationary lenses 23 and 24. The light rays then pass through a rotating block of glass 25 having four spherical surfaces. The construction and use of this block of glass is described and claimed in one of the prior applications referred to above. This system of three lenses forms an image adjacent to the output surface of the block of glass 25 and this image is positioned in the plane of a mask 26. This first image is then focused by projection lens 18 to form a second image on the viewing screen (not shown) some distance from the projector.

It will be noted that this type of projector forms two image planes and therefore produces an additional reversal of the film picture. For this reason the supply reel 11 is positioned at the bottom of the projector and the take-up reel 12 is at the top, thereby moving the film 13 through the object plane in a direction which is the reverse of the direction generally used.

The main drive which moves the film through the object plane is a sprocket wheel 27 which is connected to the motor 15 by the usual gearing and which operates to move the film at a predetermined constant speed. Two guide rollers 28 and 30 are positioned at the lower end of the film guide. These rollers are secured to a portion of the machine and cannot move their axles in any direction. The film is maintained in engagement with sprocket wheel 27 by idler rollers 31 and 32 which are secured to a movable arm 33 pivoted at 34. The movable arm is connected to a helical spring 35 which urges it out of engagement with the sprocket wheel and the film guide. An additional idler roller 36 is mounted on arm 33 so that the film may be drawn away from the sprocket wheel when spring 35 moves arm 33 into its non-engaging position. The lower idler roller 32 presses the film 13 into contact with rollers 28 and 30 and, in order to insure a firm contact at all times, roller 32 is mounted on a short pivoted arm 37, resiliently stressed by a spiral spring 38.

Figure 3:
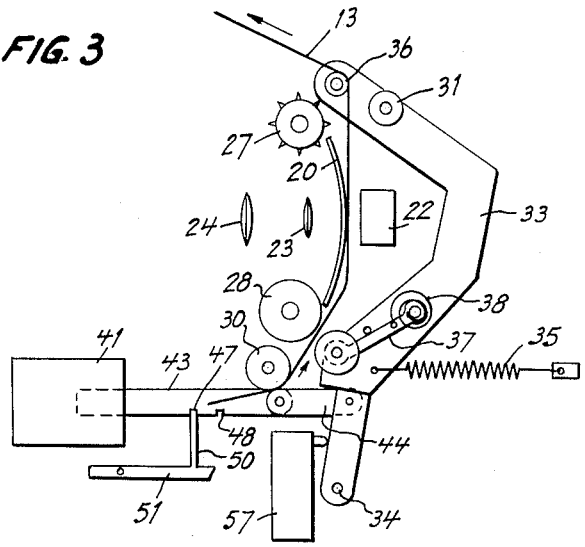
FIG. 3 is a side view similar to FIG. 2 showing the movable arm in its disengaged position together with the solenoid and a portion of a relay.

It will be obvious from the above description that the film can be placed into slot 40 between covers 16 and 17 prior to turning on the electrical power which supplies the lamp 14 and the motor 15. No further adjustment is necessary. When the arm 33 is moved into its engaging position roller 31 presses the film against sprocket wheel 27. The sprocket wheel revolves in a counter-clockwise direction as shown in FIGS. 2 and 3 and pulls the film 13 over the curved surface of film guide 20. The resiliently stressed idler roller 32 presses the film against the other idler rollers 28 and 30 and maintains contact with the film guide without buckling. It will be noted that, in the non-engaging position, the film can run freely through the slot 40 and, if sufficient torque is applied to either the supply reel or the take-up reel, the film can be rapidly advanced or reversed without removing it from the slot 40. The operator of the projector can then select any desired portion of the film without unnecessary delays or manipulation.

Figure 4:
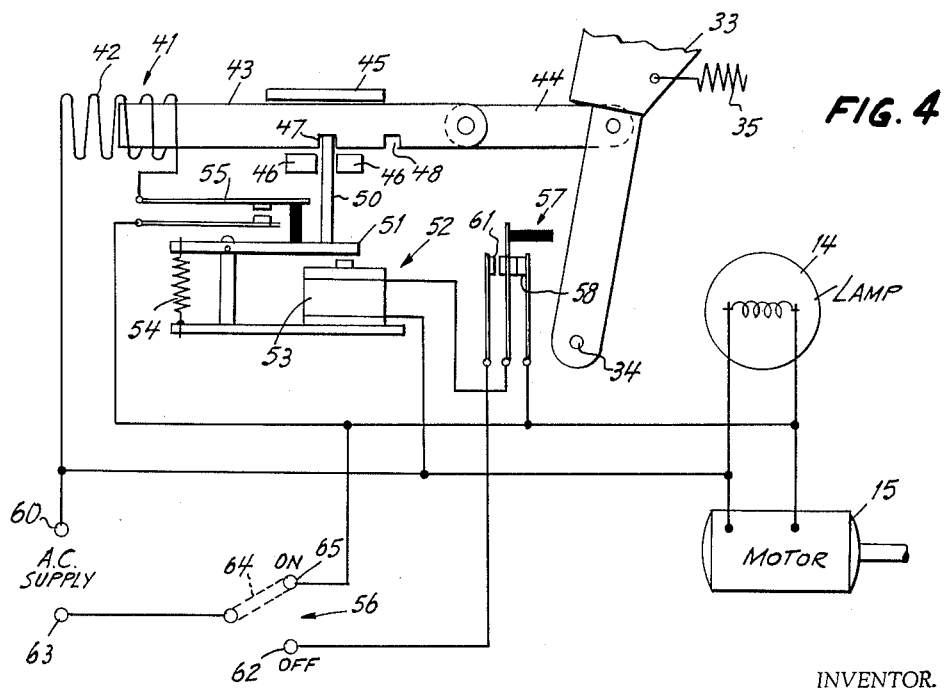
FIG. 4 is a schematic diagram of connections showing the solenoid and relay circuits and two microswitches.

The circuit diagram shown in FIG. 4 shows one way in which the movable arm 33 may be controlled to move into and out of film engagement position. The control circuit includes a solenoid 41 having a winding 42 and a plunger core 43. The core is coupled to arm 33 by means of a linkage 44. The core 43 moves within guides 45 and 46 and contains two slots 47 and 48. The core 43 is maintained in either its operated or non-operated position by means of a latch 50 operated by an armature 51 which is part of a relay 52 having a winding 53. The relay armature is coupled to the usual spring 54 which urges the armature into its non-operated position. The armature 51 is also coupled to a microswitch having contacts 55 which are connected in series with the solenoid winding 42 and an "ON-OFF" switch 56.

The movable arm 43 moves about pivot 34 and when in its non-engaging position, as shown in FIGS. 3 and 4, a microswitch 57 closes contacts 58 in series with the relay winding 53 and one terminal 60 of the power supply. When arm 33 is moved into its film engaging position, contacts 61 are closed and contacts 58 are opened. Contacts 61 are connected in series with terminal 60, relay winding 53, and the "OFF" terminal 62. Input terminals 60, 63 are for connection to an alternating current power supply and when switch arm 64 is connected to the "ON" switch terminal 65, full line power is supplied to the lamp 14 and motor 15.

The operation of this control circuit is as follows: let it be assumed that the movable arm is in its disengaged position as shown in the drawing and that switch arm 64 has just been turned to the "ON" contact 65. Current is supplied to the lamp and motor and, in addition, flows from terminal 63 through contacts 58, winding 53, to the other supply terminal 60. This current operates the relay armature pulling latch 50 from notch 47 and closing contacts 55. This action sends current through the solenoid winding 42, attracting plunger 54 and moving arm 33 and its idler rollers into film engagement. As soon as arm 33 moves to its new position contacts 58 are opened and the current through the relay winding is broken, returning armature 51 and latch 50 to their normal position. At this time, latch 50 moves into notch 48, holding the plunger in its operated position. At the time the latch 50 is moved into notch 48, contacts 55 are opened and current is cut off from the solenoid winding. All components are now in their running position and the motion picture images are projected in sequence to the viewing screen.

When the operator desires to stop the projection he simply turns switch arm 64 to the "OFF" terminal 62. This sends current from terminal 63, through switch 56 and contacts 61 which are now closed. The circuit continues through relay winding 53, over conductor 66 to the other supply terminal 60. This circuit actuates relay armature 51, withdrawing latch 50 and permitting the movable arm to return to its disengaged position under the action of spring 35. As soon as arm 33 moves away from its engage position, contacts 61 open and current is cut off from all circuit components. Latch 50 again moves into slot 47 under the action of spring 54 and the entire machine is normalized. During the disengage operation, contacts 55 are closed for a short time interval but no current flows through the solenoid winding because switch arm 64 is on contact 62.

The foregoing disclosure and drawings are merely illustrative of the principles of this invention and are not to be interpreted in a limiting sense. The only limitations are to be determined from the scope of the appended claims.

What is claimed is:

1. A film engagement device in a motion picture projector comprising, a motion picture film having discrete images and a plurality of spaced sprocket holes, an apertured film guide defining an object plane for guiding the film during projection, a driven sprocket wheel positioned adjacent to one end of the film guide for engaging the film and for pulling it through the object plane, a movable arm carrying at least one idler roller for shifting the film into engaging position with the sprocket wheel, a solenoid mechanically coupled to said arm for moving it into engaging position, and an electrical control circuit coupled to the solenoid for supplying it with current when electrical power is supplied to the projector.

2. A film engagement device in a motion picture projector comprising, a motion picture film having discrete images and a plurality of spaced sprocket holes, an apertured film guide defining an object plane for guiding the film during projction, a driven sprocket wheel positioned adjacent to one end of the film guide for engaging the film and for pulling it through the object plane at a constant predetermined speed, a movable arm carrying at least one idler roller for shifting the film into and out of engaging position with the sprocket wheel, a resilient means for moving the arm out of engaging position, a solenoid mechanically coupled to said arm for moving the arm and idler roller into engaging position, and an electrical control circuit coupled to the solenoid for supplying it with current when electrical power is applied to the projector.

3. A film engagement device in a motion picture projector casing comprising, a motion picture film having discrete pictures and a plurality of spaced sprocket holes, an apertured film guide defining an object plane for an optical projection system which includes a rotary image displacement lens for producing a stationary image of each successive film picture while the film is moving through the object plane at a constant speed, a driven sprocket wheel positioned adjacent to one end of the film guide for engaging the film sprocket holes and for pulling the film through the object plane at a constant speed, a movable arm carrying a plurality of idler rollers for shifting the film into and out of engaging position with the sprocket wheel, a resilient means for moving the arm out of engaging position, a solenoid having a plunger mechanically coupled to said arm for moving the arm and the idler rollers into film engaging position, and an electrical control circuit coupled to the solenoid winding for supplying it with current when electrical power is applied to the projector.

4. A film engagement device as claimed in claim 3 wherein said sprocket wheel pulls the film from a storage supply reel and delivers it to a driven take up reel and wherein one of said idler rollers is resiliently stressed to press the film between two idler rollers.

5. A film engagement device as claimed in claim 3 wherein said movable arm is pivoted at a position removed from the film guide and wherein a helical spring is coupled between a portion of the arm and a portion of the casing for moving the arm out of its film engaging position.

6. A film engagement device according to claim 3 including means for selectively applying high-speed torque to the reels holding said film while said device is in its non-engaging position, whereby the film can be rapidly moved past the apertured film guide.

7. A film engagement device in a motion picture projector comprising, a motion picture film having discrete pictures thereon, an apertured film guide defining an object plane, means for pulling the film through the object plane in contact with the guide, a movable arm carrying a plurality of idler rollers for shifting the film into and out of engagement with the guide, a solenoid having a plunger mechanically coupled to said arm for movement thereof, an electromagnetic relay including a winding and an armature, said armature adapted to engage a portion of said plunger to hold the plunger in either an actuated or a non-actuated position when the relay is normalized, and a pair of normally open contacts operated by the relay armature, said contacts connected in series with the solenoid winding and a source of electric power.

8. A film engagement device in a motion picture projector comprising, a motion picture film having discrete pictures thereon, an apertured film guide defining an object plane, means for pulling the film through the object plane in contact with said guide, a pivoted arm carrying a plurality of idler rollers for shifting the film into and out of engagement with the guide, an electric lamp for supplying light for the film during projection, an electric motor for supplying mechanical power to move the film during projection, a source of electric power for operating the lamp and motor, a solenoid having a plunger mechanically coupled to said arm for movement thereof, an electromagnetic relay including a winding and an armature, said armature adapted to engage a portion of said plunger to hold the plunger in either an actuated or a non-actuated position when the relay armature is in its non-actuated position, and a pair of normally open contacts operated by the relay armature, said contacts connected in series with the solenoid winding and the source of electric power.

9. A film engagement device as claimed in claim 8 wherein an on-off switch is connected in series with said source of power; an "ON" contact in said switch connected to the lamp, the motor, and the contacts operated by the relay armature.

10. A film engagement device as claimed in claim 9 wherein a normally closed pair of contacts is positioned adjacent to a portion of said movable arm and is opened when the arm is moved to its film engaging position, said pair of contacts connected in series between the "ON" contact in said switch and said relay winding.

11. A film engagement device as claimed in claim 9 wherein a normally open pair of contacts is positioned adjacent to a portion of said movable arm and is closed when the arm is moved to its film engaging position, said pair of contacts connected in series with an "OFF" terminal of said switch and said relay winding.

References Cited by the Examiner
UNITED STATES PATENTS 2,051,785   8/1936   Foster _____ 352—158

JULIA E. COINER, *Primary Examiner.*